(12) United States Patent
Yasuda et al.

(10) Patent No.: US 6,501,901 B2
(45) Date of Patent: Dec. 31, 2002

(54) APPARATUS AND METHOD FOR PERFORMING AN EDITING OPERATION ON DATA READ-OUT FROM A STORAGE MEDIUM WHICH ALLOWS RANDOM ACCESS

(75) Inventors: Mikita Yasuda, Kanagawa (JP);
Katsumi Tahara, Kanagawa (JP);
Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/009,049

(22) Filed: Jan. 20, 1998

(65) Prior Publication Data

US 2002/0106186 A1 Aug. 8, 2002

(30) Foreign Application Priority Data

Jan. 23, 1997 (JP) .............................................. 9-010497

(51) Int. Cl.[7] ................................................. H04N 5/93
(52) U.S. Cl. ............................ 386/52; 386/55; 386/111
(58) Field of Search ................................. 386/4, 33, 52, 386/58, 64, 111; 345/328; H04N 5/93

(56) References Cited

U.S. PATENT DOCUMENTS

| | | | | |
|---|---|---|---|---|
| 5,945,931 A | * | 8/1999 | Tahara et al. | 341/50 |
| 5,949,792 A | * | 9/1999 | Yasuda et al. | 370/474 |
| 6,055,271 A | * | 4/2000 | Yasuda et al. | 375/240 |
| 6,201,925 B1 | * | 3/2001 | Brewer et al. | 386/52 |

FOREIGN PATENT DOCUMENTS

| | | |
|---|---|---|
| EP | 0 522 853 | 1/1993 |
| EP | 0 590 881 | 4/1994 |
| EP | 0 684 570 | 11/1995 |
| EP | 0 700 220 | 3/1996 |
| EP | 0 778 572 | 6/1997 |
| WO | WO 93 21636 | 10/1993 |
| WO | WO 96/20567 | 7/1996 |

OTHER PUBLICATIONS

Patent Abstracts of Japan vol. 011, No. 177 (P–583), Jun. 6, 1987 & JP 62 006469 A (Matsushita Electric Ind Co Ltd), Jan. 13, 1987.
Patent Abstracts of Japan vol. 095, No. 009, Oct. 31, 1995 & JP 07 153238 A (Sharp Corp), Jun. 16, 1995.
Shiu J et al: "A Low–Cost Editor for MPEG–1 System Streams" IEEE Transactions on Consumer Electronics, US, IEEE Inc. New York, vol. 41, No. 3, Aug. 1, 1995, pp. 620–625, XP000539515.

* cited by examiner

Primary Examiner—Vincent Boccio
(74) Attorney, Agent, or Firm—Frommer Lawrence & Haug LLP; William S. Frommer; Dennis M. Smid

(57) ABSTRACT

When editing an image signal and a sound signal or these signals multiplexed using a conventional digital signal editing apparatus, it is necessary to provide a reproduction apparatus for reproducing an original signal and a recording apparatus for recording the signal edited. This significantly increases the size of the editing system.

According to the present invention, a read-out unit 2 reads out I pictures, B pictures, P pictures, and a reproduction information on a reproduction interval of this coded data from a storage medium 1 allowing random access. A storage unit 3 stores the reproduction information read out from the storage medium 1 by the read-out unit 2. A control unit 3 controls read-out of the read-out unit 2 according to the aforementioned reproduction information from the storage unit 3. A decoding unit 5 decodes the coded data which have been read out by the read-out unit 2 controlled by the control unit 4, in such a manner that the data are temporally continuous and outputs an edited decoded data string.

18 Claims, 12 Drawing Sheets

| F0 | F2a | F2b | F3a | F3b | F1 |

FIG.9B

TOC1 | F0 | F2a | F2b | F3a | F3b | F1 |

FIG.9C

TOC2 | F0 | F2a | F3b | F1 |

FIG.9D

TOC3 | F3b | F1 | F0 | F2a | F2b | F3a |

APPARATUS AND METHOD FOR PERFORMING AN EDITING OPERATION ON DATA READ-OUT FROM A STORAGE MEDIUM WHICH ALLOWS RANDOM ACCESS

BACKGROUND OF THE INVENTION

1. Field of the Invention

The present invention relates to a digital signal editing apparatus and method which can preferably be employed when editing and displaying a moving image signal and an acoustic signal recorded on a storage medium which allows random access such as a magneto-optical disc.

2. Description of the Related Art

FIG. 1 shows configuration of a digital signal editing system for editing at least one coded data string recorded on a storage medium which allows random access such as an optical disc.

A coded data constituting said coded data string recorded in a storage medium 31 is reproduced by a reproduction apparatus 32 whose reproduction timing is controlled by a control unit 33, and is displayed on a display unit 34. Whiles the data is displayed on the display unit 34, a portion to be edited is determined by an editor.

The control unit 33, after moving a read position of the storage medium 31 up to the portion to be edited, makes the reproduction apparatus 32 start reproduction of a signal. The control unit 33 also controls the recording timing of the recording apparatus 35. When the reproduction apparatus 32 starts reproduction of a signal, the signal is recorded on another recording medium 36 in the recording apparatus 35.

For this, the reproduction apparatus 32 and the recording apparatus 35 should be synchronized for operation. This synchronization is controlled by a signal from the control unit 33. Note that a signal transmitted from the reproduction apparatus 32 to the recording apparatus 35 is a coded signal which has been decoded or not. When a decoded signal is transmitted from the reproduction apparatus 32 to the recording apparatus 35, the reproduction apparatus 32 decodes by a decoder a coded data from the storage medium 31, so as to be transmitted to the recording apparatus 35, which receives the decoded signal and codes the signal, which is recorded on the storage medium 36.

FIG. 2 shows configuration of a digital signal editing system for carrying out a nonlinear edition. A data recorded on a storage recording medium 40 having a large capacity such as a magnetic tape is reproduced by a recording/reproduction apparatus 41 and read out to a storage unit 43 which allows random access such as a hard disc drive (HDD) connected to an editing unit 43. This storage unit 43 may be built in the editing unit 42. A data which is read out here is a coded data or an original signal such as an image/sound signal or the like according to the configuration of the editing system.

An editor, while checking the image/sound signal on a display unit 44, edits a data in the storage unit 43 by the editing unit 42 and records the edited data in the storage unit 40 by using the recording/reproduction apparatus 41. As this editing unit 42, a personal computer and a work station may be used. In such a case, the storage unit 43 may be an HDD or RAM connected to (or built in) the computer.

It is possible to increase the editing efficiency by reading a data into the storage unit 43 allowing random access, but it is necessary that a data be read from the storage medium 40 into the storage unit 43 and, after edition is complete, the data should be written back into the aforementioned storage medium 40. In the same way as the example of FIG. 1, the system of FIG. 2 requires a reproduction process and a recording process.

A typical editing operation using the editing system shown in FIG. 1 and FIG. 2 will be explained below with reference to FIG. 3. FIG. 3A shows a part of data $D_1$ to be deleted and the data $D_0$ preceding the deleted data is connected to the data $D_2$ following the deleted data. This operation will be referred to as a skip edition.

FIG. 3B shows a data divided at point $P_A$ into a data part $D_0$ and a data part $D_1$, between which another data part $D_2$ is inserted. This editing operation will be referred to as an insert edition.

FIG. 3C shows a data part $D_1$ replaced by another data $D_3$. This operation will be referred to as a replacement edition.

Recently, in a system for recording an image signal and a sound signal on a recording medium such as an optical disc and a magnetic tape and reproducing the signal on a display unit, or in a video conference system or a visual telephone system in which an image signal and a sound signal are transmitted from a transmission side via a predetermined transmission path so as to be displayed at a reception side, these image and sound signals, after A/D conversion, are often subjected to coding by the MPEG (Moving Picture Experts Group) method for compressing a data amount.

Here, the MPEG is an abbreviation of a working group for moving image coding for storage, which belongs to ISO/IEC JTC1/SC29 (International Organization for Standardization/International Electrotechnical Commission, Joint Technical Committee 1/Sub Committee 29). There are ISO11172 as the MPEG1 standard, and ISO13818 as the MPEG2 standard. In these international standards, there are ISO11172-1 and ISO13818-1 for system multiplexing; ISO11172-2 and ISO13818-2 for image coding; and ISO11172-3 and ISO13818-3 for sound coding.

In order to code an image with a high efficiency and to realize random access, the MPEG provides three coding types: I picture, B picture, and P picture. Here, the term 'picture' represents a coded screen (frame or field) constituting a moving image.

The I picture is a data for which coding is complete in the aforementioned screen and is coded independently of another screen. Consequently, the I picture is used as an entry point for random access and error recovery. However, if the frequency of the I picture becomes high, the coding efficiency is lowered.

The P picture means a mode for carrying out forward predictive coding and is predicted from an I picture or P picture which is temporally in the past. Consequently, in order to decode a P picture, it is necessary that the preceding I picture or P Picture have been decoded. By using the P picture, the coding efficiency is increased in comparison with a case when carrying out coding only using the I picture.

The B picture is an advanced step of the P picture and provides a mode for carrying out predictive coding in both directions, i.e., by using I pictures or P pictures of the past and the future, prediction is carried out in a forward direction, a backward direction, or in both directions. Consequently, in order to decode a B picture, the preceding and the following I picture or P picture should have been decoded. By introducing this B picture, the coding efficiency is significantly improved.

In general, an ordinary application employs the aforementioned I, B, and P pictures in combination so as to obtain random access and a high coding efficiency.

FIG. 4A shows an example of such combination. In this FIG. 4A, the aforementioned screens (pictures) are arranged in the display order. In this FIG. 4A, each of the arrows indicates a prediction direction. For example, when a B picture is to be decoded for display, the preceding and the following (temporally) I picture or P picture should be decoded prior to decoding the B picture.

More specifically, in a case when realizing the display order of the aforementioned FIG. 4A, in order to decode an image of the picture B5, at least pictures I0, P2, P4, and P6 should be decoded in advance. That is, the picture P2 is predicted from the picture I0; the picture P4 is predicted from the picture P2; the picture P6 is predicted from the picture P4; and the picture B5 is predicted from the pictures P4 and P6. Consequently, in order to decode the picture B5, the pictures I0, P2, P4, and P6 should be decoded in advance.

Therefore, as shown in FIG. 4B, these pictures are arranged in the coded stream in the order of I0, P2, B11, P4, B3, . . . In other words, the coded stream of pictures as shown in FIG. 4B is recorded on the recording medium. Consequently, when reproducing this recording medium for display an image on a display unit, the pictures are decoded from the coded stream reproduced from the recording medium and they are re-arranged as shown in FIG. 4A for display.

In the so-called CD and DVD (digital versatile disc) which have been normalized and introduced on market, an image is coded by the MPEG method having the aforementioned configuration and a sound is coded by the MPEG or AC-3 (ATSC standard DOC.A/52, Dec. 20, 1995) method. These data are time division multiplexed by the MPEG system specification and recorded on the disc.

When the editing system as shown in FIG. 1 is used for editing an image signal and a sound signal or these signals which have bee multiplexed, it is necessary to provide a reproduction apparatus for reproducing an original signal and a recording apparatus for recording a signal after edition, increasing the size of the entire system.

For example, if it is assumed to carry out edition using a storage medium containing an image signal which has been coded by the aforementioned MPEG method, in order to increase the coding efficiency, the MPEG usually includes a predictive coding mode (i.e., including B pictures and P pictures). Consequently, when carrying out on frame basis, firstly a coded data is read out to be decoded and an image signal obtained is edited and coded again, after which the signal is recorded in a storage medium, thus requiring a large editing system. Moreover, two storage media are required: one containing an original signal coded and the other for recording a data after edition.

Furthermore, in such an editing system, a signal edited is recorded again on another storage medium, which requires a time almost identical to the length of the image edited during edition.

Moreover, in the nonlinear edition as carried out in the editing system shown in FIG. 2, a data is transferred from a storage medium to a storage unit within a editing apparatus and the data after edition is again written into the storage medium, which requires a time for transfer and a storage unit of large capacity for keeping this data.

SUMMARY OF THE INVENTION

It is therefore an object of the present invention to provide a digital signal editing apparatus and method which does not require data re-recording after edition and enables to realize an editing system of small size and reduce a time required for edition.

In order to achieve the aforementioned object, in the digital signal editing apparatus according to the present invention, read-out by read-out means is controlled by control means according to a reproduction information on a reproduction interval of a coded data, and this read-out coded data is decoded by decoding means so as to output an edited decoded data string.

Moreover, according to the digital signal editing method according to the present invention, in order to achieve the aforementioned object, a plurality of coded data are read out from a storage medium allowing random access, according to the aforementioned reproduction information on a reproduction interval of the coded data, and the read-out coded data are L decoded so as to be continuous temporally and made into an edited decoded data string.

BRIEF DESCRIPTION OF THE DRAWINGS

FIG. 8 explains edition using TOC information carried out by the aforementioned first embodiment.

FIG. 9 explains operation of the aforementioned first embodiment when a plurality of TOC information are defined.

DETAILED DESCRIPTION OF THE PREFERRED EMBODIMENTS

Description will now be directed to a digital signal editing apparatus and method according to embodiments of the present invention with reference to the attached drawings.

The digital signal editing apparatus according to the embodiments reads out a plurality of coded data constituting at least one coded data string from a storage medium allowing random access and uses these coded for editing and decoding the aforementioned coded data string.

As the coded data, the three coding types used in the MPEG method are used, i.e., I pictures, B pictures, and P pictures. Hereinafter, explanation will be given on three specific embodiments.

Figure 5:
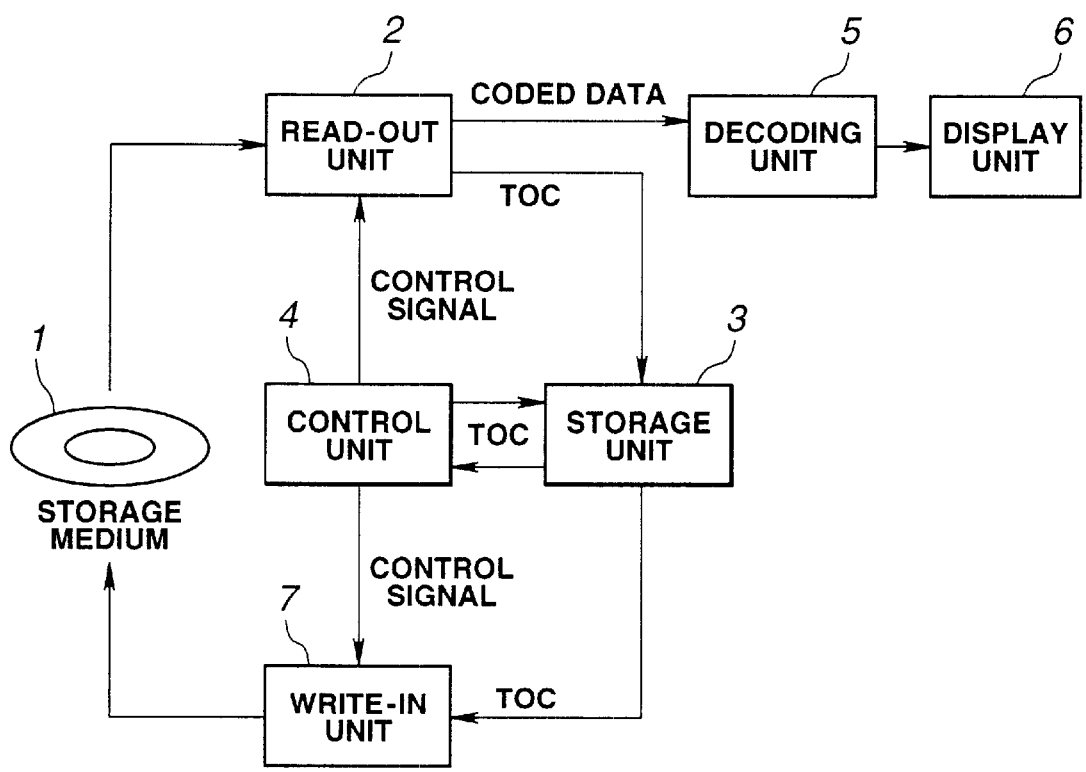
FIG. 5 is a block diagram showing a digital signal editing apparatus and method according to a first embodiment of the present invention.

FIG. 5 shows a digital signal editing apparatus according to a first embodiment including: a read-out unit 2 for reading out from a storage medium 1 such as an optical disc allowing random access the aforementioned coded data as I pictures, B pictures, and P pictures and a reproduction information on a reproduction interval of the coded data; a storage unit 3 for storing the reproduction information which has been read out from the storage medium 1 by this read-out unit 2; a control unit 4 for controlling read-out of the read-out unit 2 according to the reproduction information from the storage unit 3; and a decoding unit 5 for decoding the coded data which has been read out by the read-out unit 2 controlled by the control unit 4, so as to be temporally continuous, and outputting a decoded data string which has been edited.

The storage medium 1 contains a coded data string consisting of the aforementioned I pictures, B pictures, and P pictures as well as a reproduction information on a reproduction interval of the coded data constituting this coded data string. Here, the reproduction information has been written, for example, as a TOC information in the TOC (Table of Contents) area of an optical disc.

This reproduction information on the reproduction interval contains a data on a reproduction start point, a reproduction end point or reproduction interval length, and the like. For example, when the TOC area contains a plurality of reproduction information, the coded data corresponding to the respective reproduction intervals are successively decoded and displayed. on a display unit 6.

During a coded data edition, the control unit 4 accesses the storage unit 3 containing the aforementioned reproduction information, modifies the reproduction information, controls read-out of the read-out unit 2, and reads out the coded data from the storage medium 1. The decoding unit 5 decodes the read-out data so as to be temporally continuous and outputs the data as a coded data string which has been edited.

Figure 1:
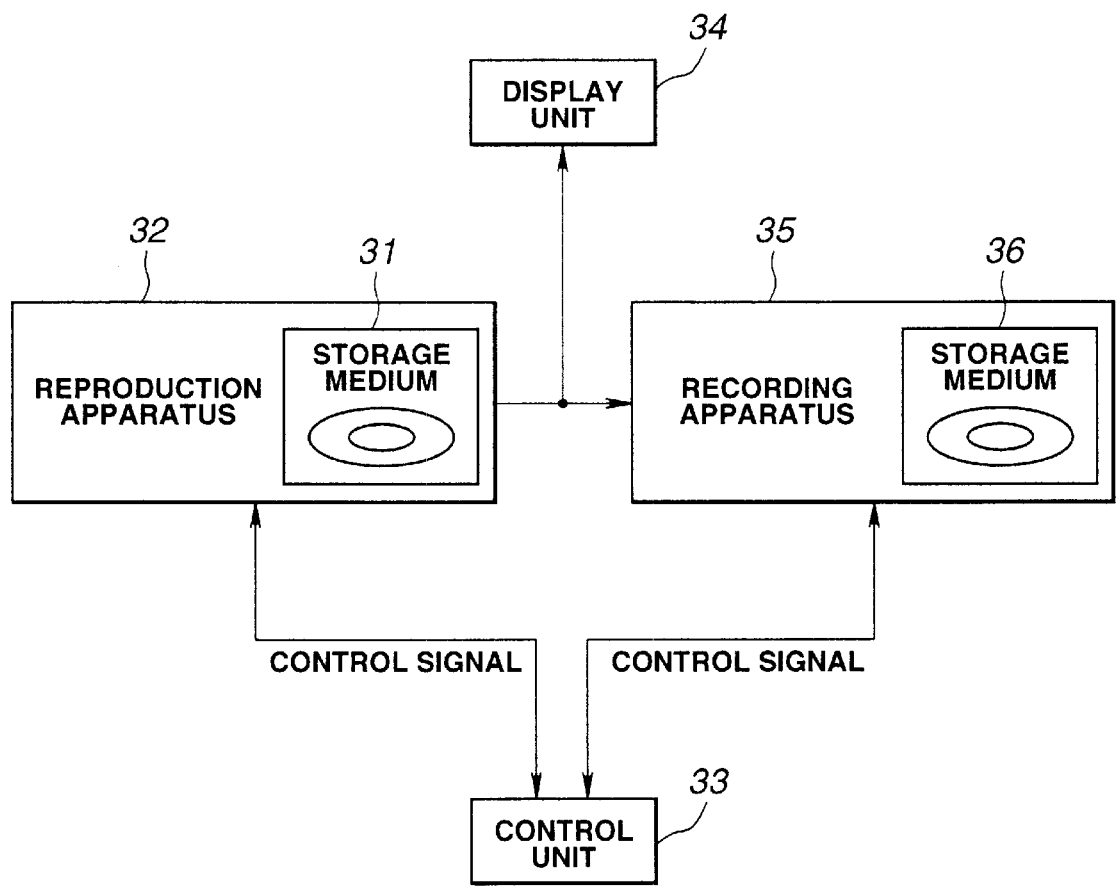
FIG. 1 is a block diagram showing a digital signal editing system according to the related art.
Figure 2:
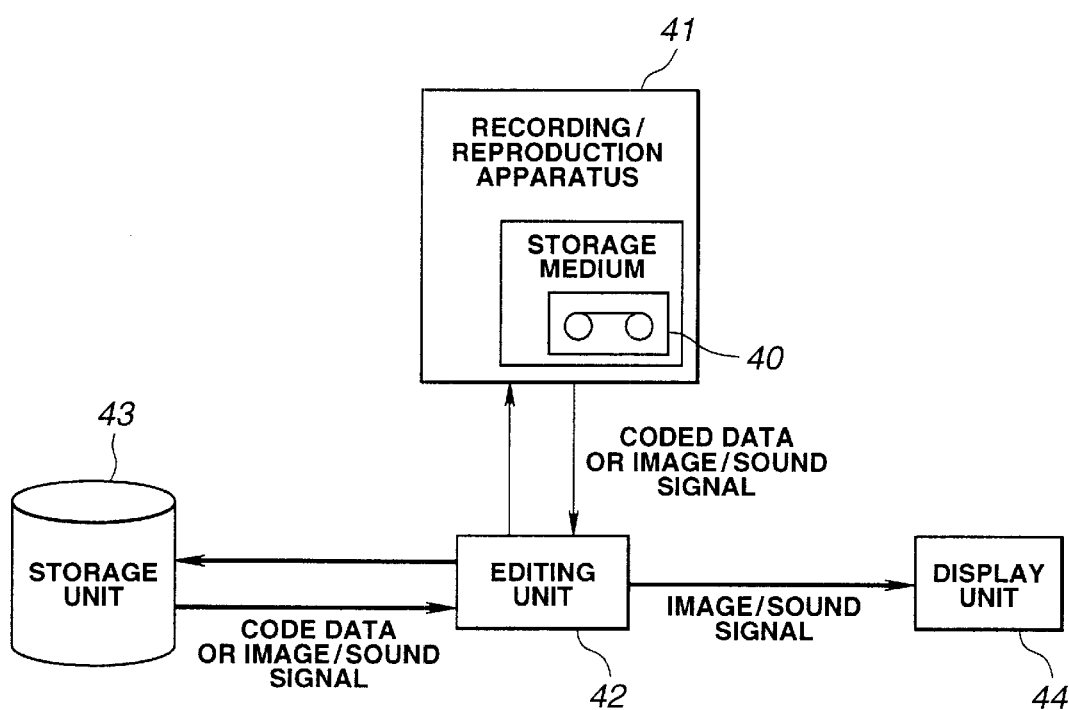
FIG. 2 is a block diagram showing a nonlinear editing system according to the related art.
Figure 3A:
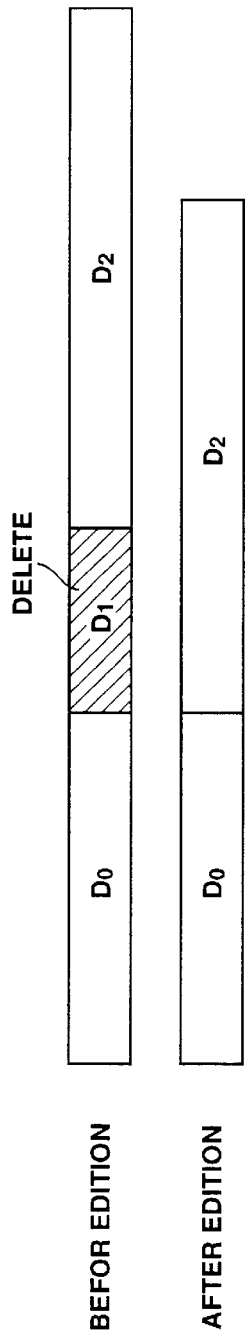
FIG. 3 explains definitions of skip edition, insert edition, and replacement edition.
Figure 3B:
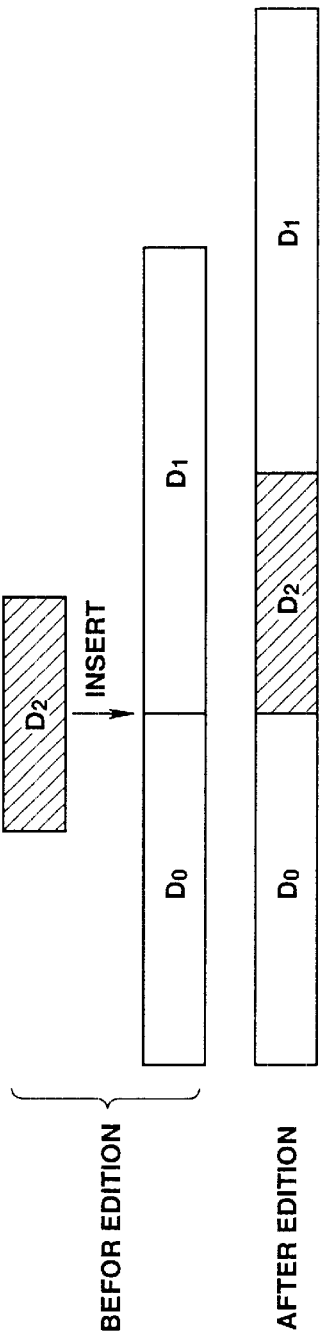
Figure 3C:
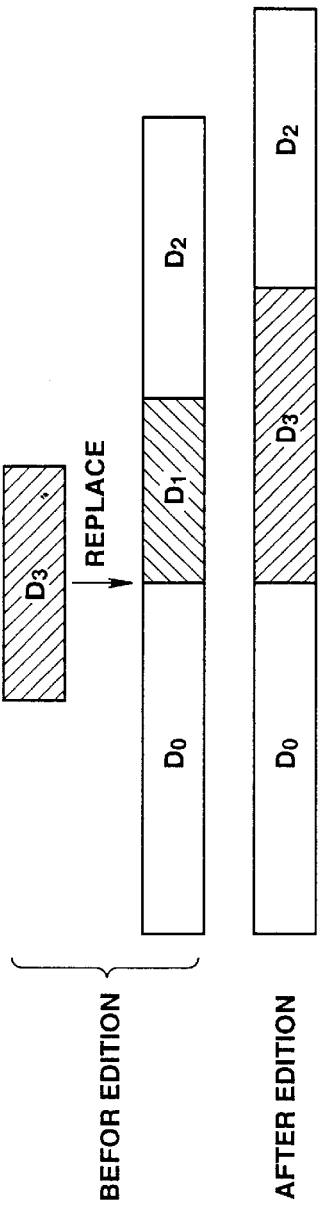
Figures 4A, 4B:
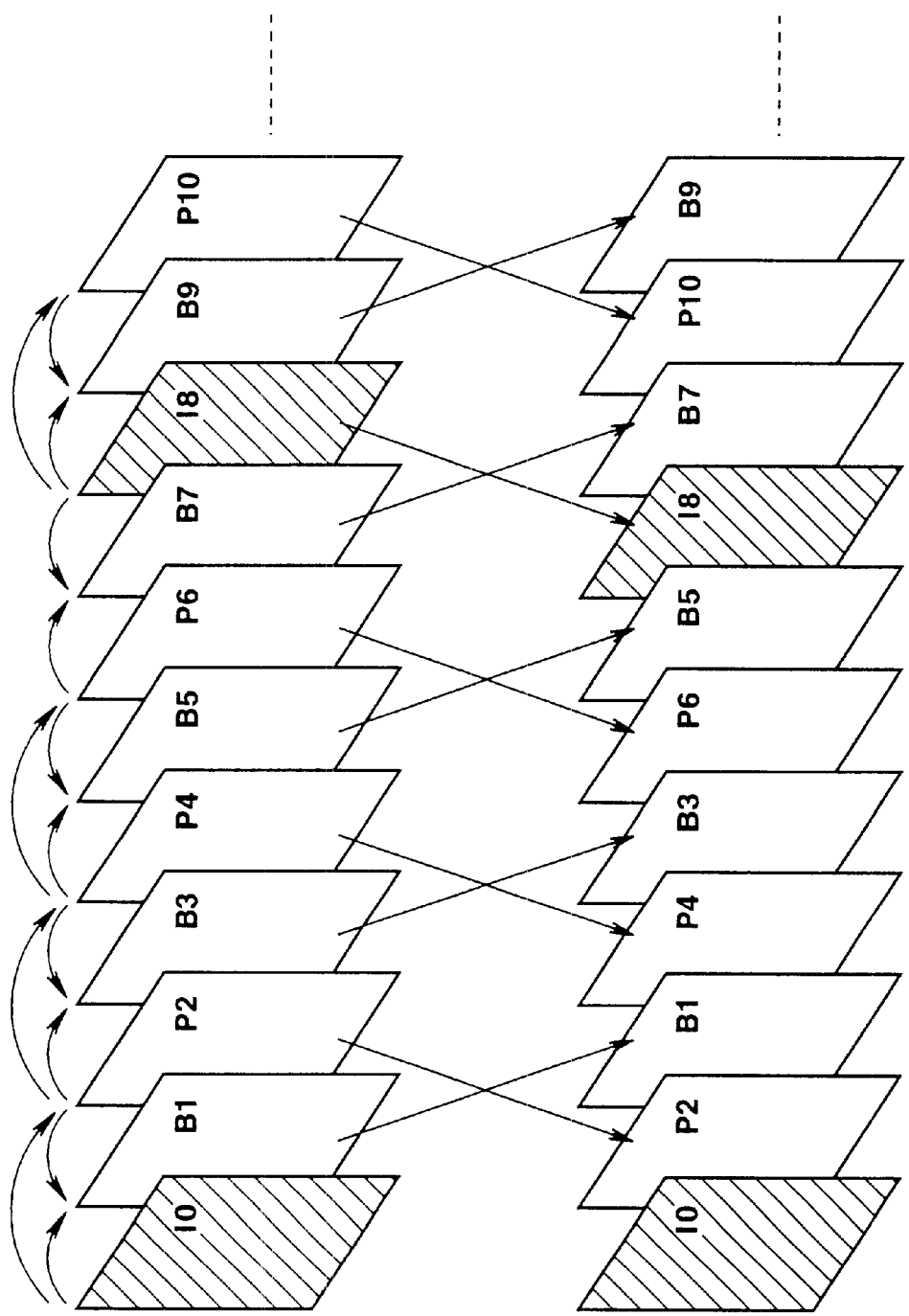
FIG. 4 explains the coding types and the prediction directions by the MPEG method.

Here, in a case when predictive coding such as the aforementioned MPEG method is employed, in order to decode an image of a certain time, an image preceding the image should have been decoded. For example, in a case of FIG. 4, decoding of the image of picture B5 requires decoding of at least I0, P2, P4, and P6.

Figure 6:
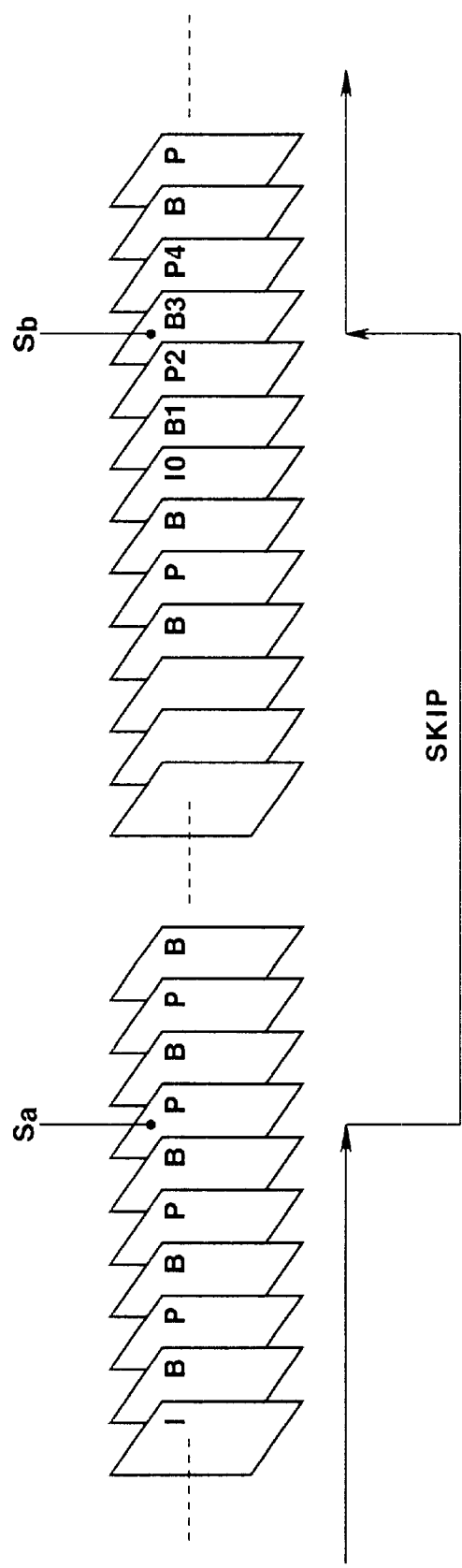
FIG. 6 explains operation of a decoding unit constituting the aforementioned first embodiment.

It is now assumed as shown in FIG. 6 that after reproducing up to picture P of the point Sa, reproduction is to be started with picture B3 at the point Sb. In an ordinary decoding apparatus, in order to decode the picture B3, it is necessary to decode the pictures I0, P2, and P4 which serve as the reference images of the picture B3. Accordingly, while these pictures I0, P2, and P4 are decoded, the display becomes discontinuous.

To cope with this, the applicant of the present invention suggested in the specification and drawings of Japanese Patent; Laid Application Hei 8-335668 a technique which enables temporally continuous reproduction of coded signals when a part of prediction-coded data is deleted.

In a decoding unit employing this technique, it is possible to connect parts of coded data which are logically discontinuous in such a manner that the data can be reproduced as a temporally continuous data.

Figure 7:
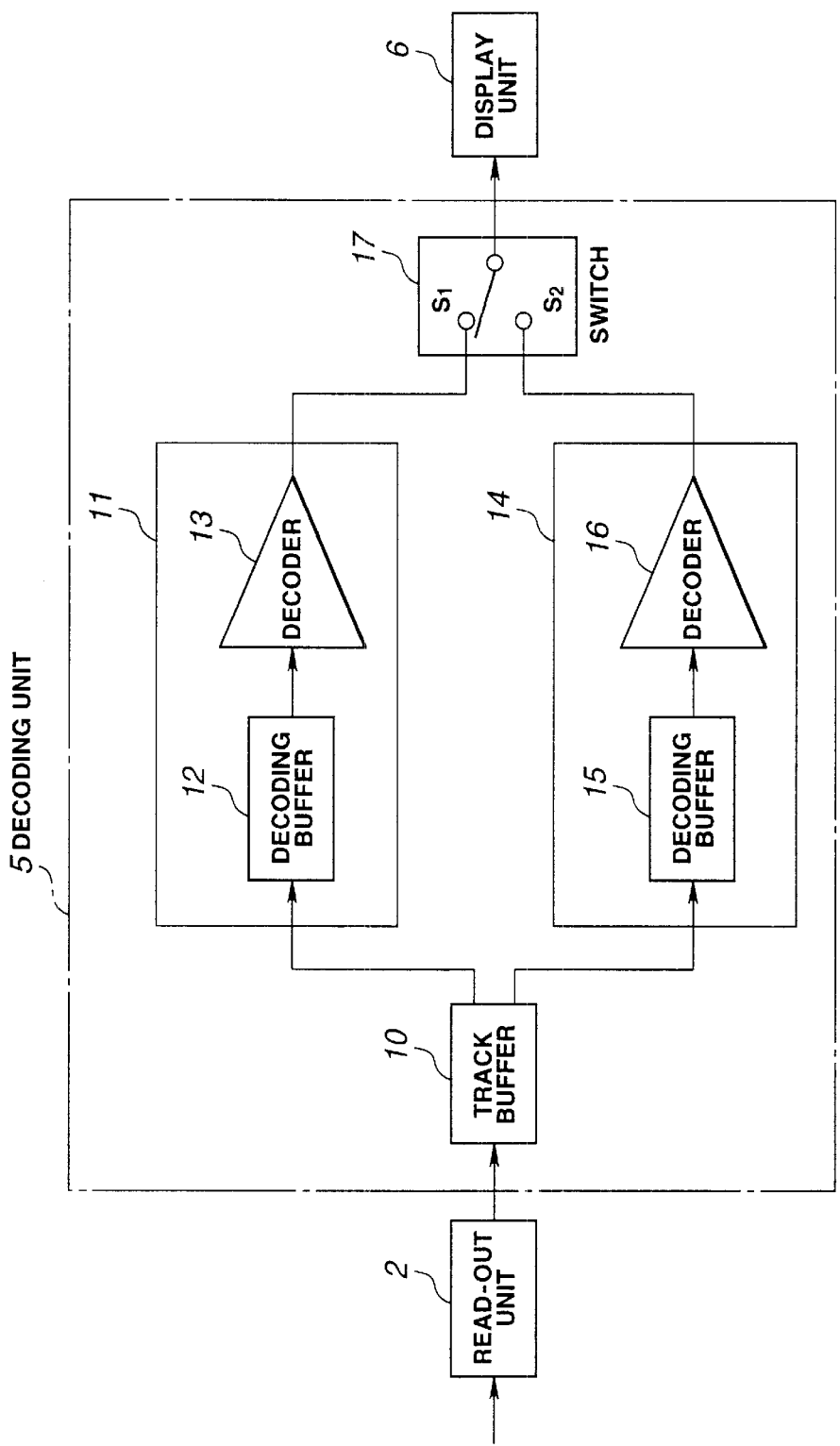
FIG. 7 is a block diagram showing a specific example of the aforementioned decoding unit.

The decoding unit 5 in the digital signal editing apparatus shown in FIG. 5 also employs this technique. For example, when carrying out a skip edition, the aforementioned decoding unit 5 operates as shown in FIG. 7. More specifically, this decoding unit 5 has two independent decoding systems 11 and 14.

The decoding system 11 decodes on conding unit basis a first coded data string preceding the data connection point for edition by random access carried out on the storage unit 1.

The decoding system 14 decodes on coding unit basis all the coded data required for decoding a first coded data of a second coded data string following the aforementioned data connection point for edition, prior to completion of decoding the aforementioned first coded data string by the decoding system 11.

In FIG. 7, a coded data which has been read out from the storage medium 1 by the read-out unit 2 is stored in a track buffer 10. The read-out unit 2 is capable of random access to the storage medium 1. For example, when carrying out a skip edition, the read-out unit 2 can successively read coded data before and after the skip, into the track buffer 10. However, in this case which employs the MPEG coding method (i.e., a difference between images is coded), all the coded data of the pictures required for decoding a destination picture are read in. In the aforementioned FIG. 6, the least data required for decoding the picture B3 of the skip destination, i.e., coded data of at least pictures I0, P2, and P4 are read into the aforementioned track buffer 10.

The coded data read out from this track buffer 10 is transmitted to the first decoding system 11 and the second decoding system 14.

The first decoding system 11 includes a decoding buffer 12 and a decoder 13, and the second decoding system similarly includes a decoding buffer 15 and a decoder 16. The decoding buffers 12 and 15 keep coded data read out from the track buffer 10 while the decoders 13 and 16 respectively provided at a later stage are decoding the data. It should be noted that read-out of a data from the track buffer 10 to the decoders 13 and 16 of the first decoding system 11 and the second decoding system 14 are carried out simultaneously, if necessary. The decoders 13 and 16 independently of each other decode coded data supplied respectively from the decoding buffers 12 and 15, A decoded data outputted from the first decoding system 11 is transmitted to a switching terminal S1 of a switch 17, whereas a decoded data outputted from the second decoding system 14 is transmitted to a switching terminal S2 of the switch 17.

This switch 17 selectively outputs to the display unit 6 coded data supplied from the first decoding system 11 and the second decoding system 14 while switching at a predetermined timing which will be detailed later. Consequently, the display unit 6 carries out display according to a decoded data from the first decoding system 11 and according to a decoded data from the second decoding system 14, which are selectively switched at the aforementioned predetermined timing.

Here, in a case when decoding a coded data which has been read out from the storage medium 1 by the read-out unit 2, so as to be temporally continuous, and displaying the coded data as it is, the display unit 6 is supplied with a decoded data which has been decoded either by the first decoding system 11 or by the second decoding system 14.

On the other hand, when decoding coded data which are temporally discontinuous due to a skip edition, the following operation is carried out.

Firstly, it is assumed that the first decoding system 11 is decoding coded data constituting the first coded data string preceding the skip point (skip start point). At this time, the switch 17 is connected to the switching terminal S1. Consequently, the display unit 6 displays data according to the decoded data preceding the aforementioned skip start point which has been decoded by the first decoding system 11, i.e., an image of coded data which has been read from the storage medium 1 and decoded prior to the skip. Thus, prior to the skip start point, a coded data preceding the skip start point which has been read from the storage medium 1 by the read-out unit 2 is read out via the track buffer 10 by the decoding buffer 12 of the first decoding system 11 and decoded by the decoder 13, and the decoded data is transmitted via the switch 17 to the display unit 6 where it is displayed.

Next, when carrying out a skip edition, the read-out unit 2, after reading a coded data preceding the skip, carries out random access to the storage medium 1 so as to read coded data constituting a second coded data string immediately after the skip (skip destination) and successively outputs the coded data preceding the skip start point and coded data near the skip destination to the track buffer 10.

Here, the coded data read from the storage medium 1 as the data after the skip includes all the data required for decoding an image to be displayed at the skip destination point. That is, in the case of FIG. 6 in which the picture of the aforementioned skip destination point is picture B3, the read-out unit 2 reads out from the storage medium 1 coded data corresponding to the pictures I0, P2, and P4 required for decoding the picture B3. More specifically, the read-out unit 2, wherein reading a recording area corresponding to an address of the skip destination point (in the example of FIG. 6, an area containing the coded data of picture B3), simultaneously with this, reproduces by random access to a recording area containing the coded data of the pictures I0, P2, and P4.

Thus, the track buffer 10 simultaneously stores the coded data of the aforementioned skip start point and the data near the skip destination point. That is, if explained with reference to FIG. 6, at this moment of time, the track buffer 10 simultaneously contains the coded data of P picture at the skip start point indicated by point Sa in FIG. 6 and the coded data of B picture (B3) of the skip destination point indicated by point Sb in FIG. 6 as well as coded data of the pictures I0, P2, and P4 required for decoding the picture B3.

The decoding unit 5, in order to obtain an effect identical to an ordinary edition by editing the aforementioned reproduction information, reads out and decodes successively in the order of the aforementioned reproduction information, the result of which is temporally-continuously displayed.

Next, description will be directed to an editing operation of the aforementioned digital signal editing apparatus. During an edition, a reproduction information in the storage unit 5 is modified instead of directly editing the coded data.

This reproduction information contains all the data required to start (terminate) display at a specified point of the coded data recorded on the storage medium 1. For example, in the case of FIG. 6 in which an image is coded by the MPEG method and recorded on an optical disc and an interval of picture B3 at point Sb and after is to be reproduced, the read-in area contains as information on the reproduction interval: a sector address containing the I0 picture which appears first of all the other pictures required for decoding the picture B3; a period of time from decoding start of this I0 picture until decoding of the B3 picture of the reproduction start point; and the like. Hereinafter, the aforementioned reproduction information will be referred to as a TOC information.

Figures 8A, 8B, 8C, 8D:
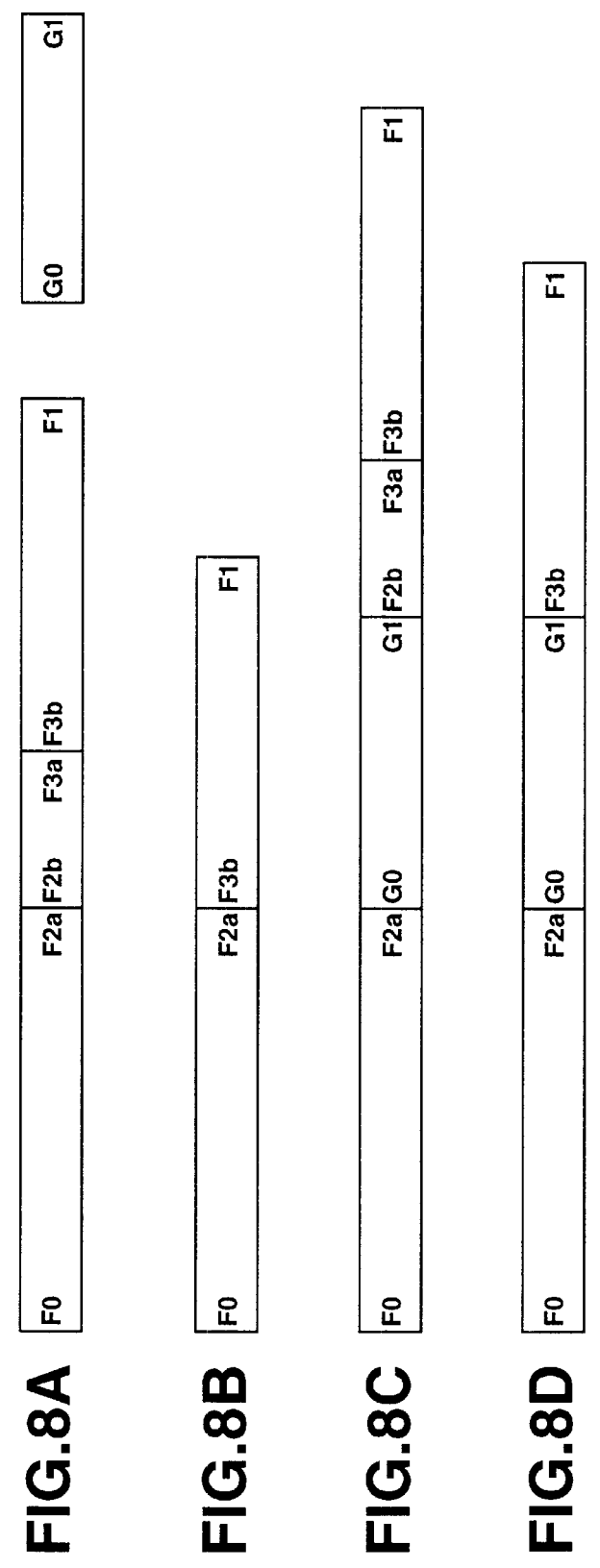

An editing process using this TOC information will be explained below with reference to FIG. 8. FIG. 8 shows a coded data prior to the edition containing a coded image signal coded and a coded sound signal of frame F0 to frame F1. A corresponding TOC information, in the initial state, contains information required for decoding/reproducing frames F0 to F1. In order to skip an interval from frame F2b to frame F3a in this state, it is necessary that the TOC information consist of a reproduction interval information of F0 to F2a and a reproduction interval information of F3b to F1. According to the TOC information thus edited, it is possible to reproduce, for example, FIG. 8B, which is equivalent to skip edition of the coded data.

Moreover, as shown in FIG. 8C, when a coded data consisting of frames G0 to G1 is to be inserted between the frame F2a and the frame F2b shown in FIG. 8A, it is necessary to edit the TOC information (containing the definition of the reproduction of the initial state F0 to F1) so that F0 to F2a, G0 to G1, and F2b to F1 will be reproduced in this order.

Furthermore, for replacement edition, the reproduction intervals of the TOC information is defined as F0 to F2a, G0 to G1, and F3b to F1. Then, after this edition, FIG. 8D will be reproduced, which is equivalent to a replacement edition of a coded data.

When the TOC information is modified, the modified TOC information is written back to the TOC information storage area on the storage medium 1 at a predetermined timing by a write-in unit 7.

Moreover, by defining a plurality of TOC information, it 4 is possible to carry out a reproduction as follows. It is assumed that a coded data has a configuration as shown in FIG. 9A. Not only the reproduction of frames F0 to F1 is defined in TOC1, but also a reproduction interval of F0 to F2a and F3b to F1 is defined in TOC2 and a reproduction interval of F3b to F1, F0 to F2a, and F2b to F3a is defined in TOC 3.

If it is possible to select one of the three definitions if of TOC information, i.e., TOC1, TOC2, and TOC3, then the corresponding reproduction route can be obtained as shown in FIGS. 9B, 9C, and 9D.

In this way, the user can readily modify the reproduction route of the coded data according to his/her will.

Moreover, according to this image edition using the TOC information, a coded data is not edited directly. Consequently, it is possible to carry out a re-edition or to cancel an edition.

Because according to the edition using the TOC information, a coded data itself is not edited, a part of the coded data not reproduced is also recorded in the storage medium 1. When it is determined not to re-utilize a part of a coded data, in order to effectively utilize the storage medium 1, it is desired to delete the unnecessary part of the coded data. According to the present embodiment, if necessary, it is possible to re-use an area containing an unnecessary coded data, i.e., to overwrite on the area so as to record other coded data.

It should be noted that when a plurality of reproduction intervals are defined in the aforementioned TOC information, the decoding unit 5 has a function to read in coded data arranged logically-discontinuously on the storage medium 1 in the order of the aforementioned reproduction information and temporally-continuously reproduce decoded signals.

Description will now be directed to a digital signal editing apparatus according to a second embodiment. This digital signal editing apparatus according to the second embodiment can be preferably used when re-using an area containing unnecessary coded data or when outputting a coded data from the editing apparatus.

Figure 10:
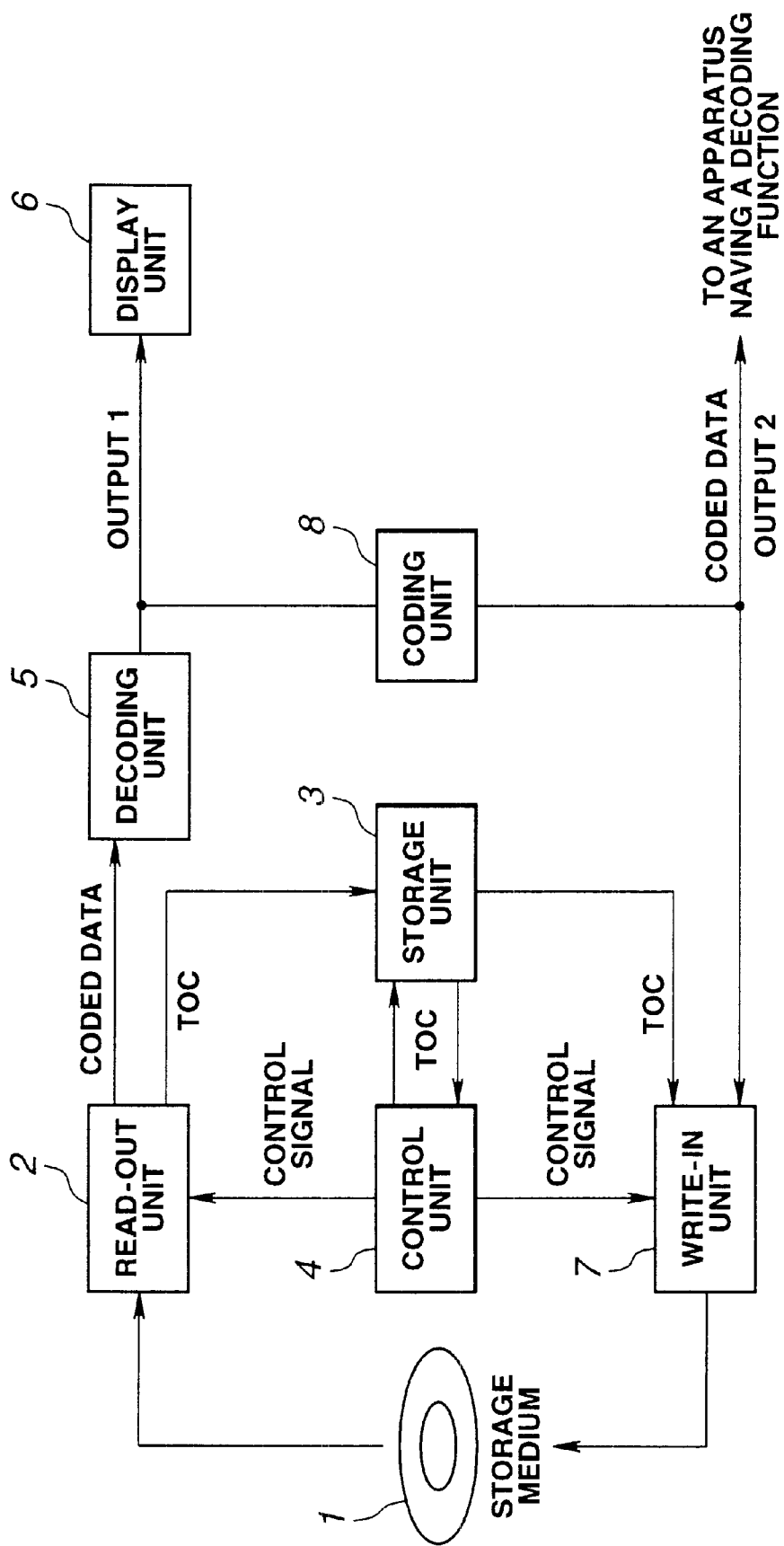
FIG. 10 is a block diagram showing a digital signal editing apparatus and method according to a second embodiment of the present invention.

FIG. 10 shows the configuration of this digital signal editing apparatus according to the second embodiment, which is identical to the configuration of FIG. 5 except for that an editing unit 8 is additionally provided. The components of the second embodiment excluding this editing unit 8 are identical to those of FIG. 5 and operate as has been explained above. In addition to the editing operation of the aforementioned. digital signal editing apparatus of FIG. 5, this digital signal editing apparatus re-codes a decoded data which is reproduced by using the TOC information, and the re-coded data is written back to the storage medium 1 by the write-in unit 7. By carrying out this re-coding, it is possible to re-utilize an area in the storage medium 1 occupied by a coded data not reproduced, enabling to effectively use the storage medium 1.

Figure 11:
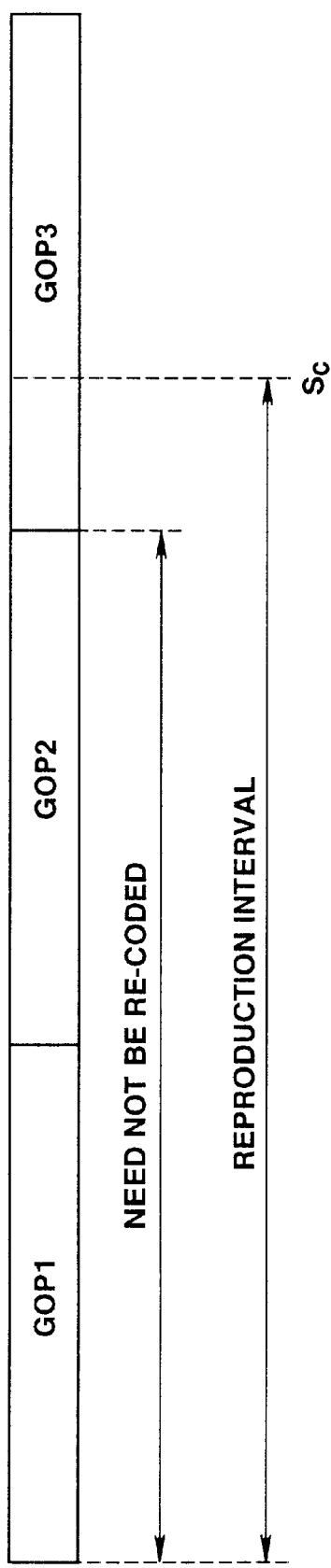
FIG. 11 explains operation of the aforementioned second embodiment.

Moreover, this digital signal editing apparatus can operate only for a necessary portion when carrying out re-coding. For example, image coding using the MPEG method has a configuration of GOP (Group of Pictures), and coding is completed on this GOP basis. Consequently, when reproducing the data in FIG. 11 up to the point Sc, GOP1 and GOP2 need not be re-coded. In this case, re-coding can be started with BOP3.

Furthermore, when fetching a coded data from another digital signal editing apparatus, it is possible to output a coded data (output 2) which has been coded by the encoding unit 8. In this case, a decoded signal is outputted as output 1, whereas a coded signal is outputted as output 2. This function is used, for example, when it is necessary to directly supply a coded data, for example, in the digital broadcasting set top box. In this case, the coded data is a data which has been edited and re-coded and a reception side can decode the data as an ordinary data without thinking of edition of a coded data.

Description will now be directed to a digital signal editing apparatus according to a third embodiment. The digital signal editing apparatus according to the third embodiment; realizes the same function as the conventional nonlinear edition.

Figure 12:
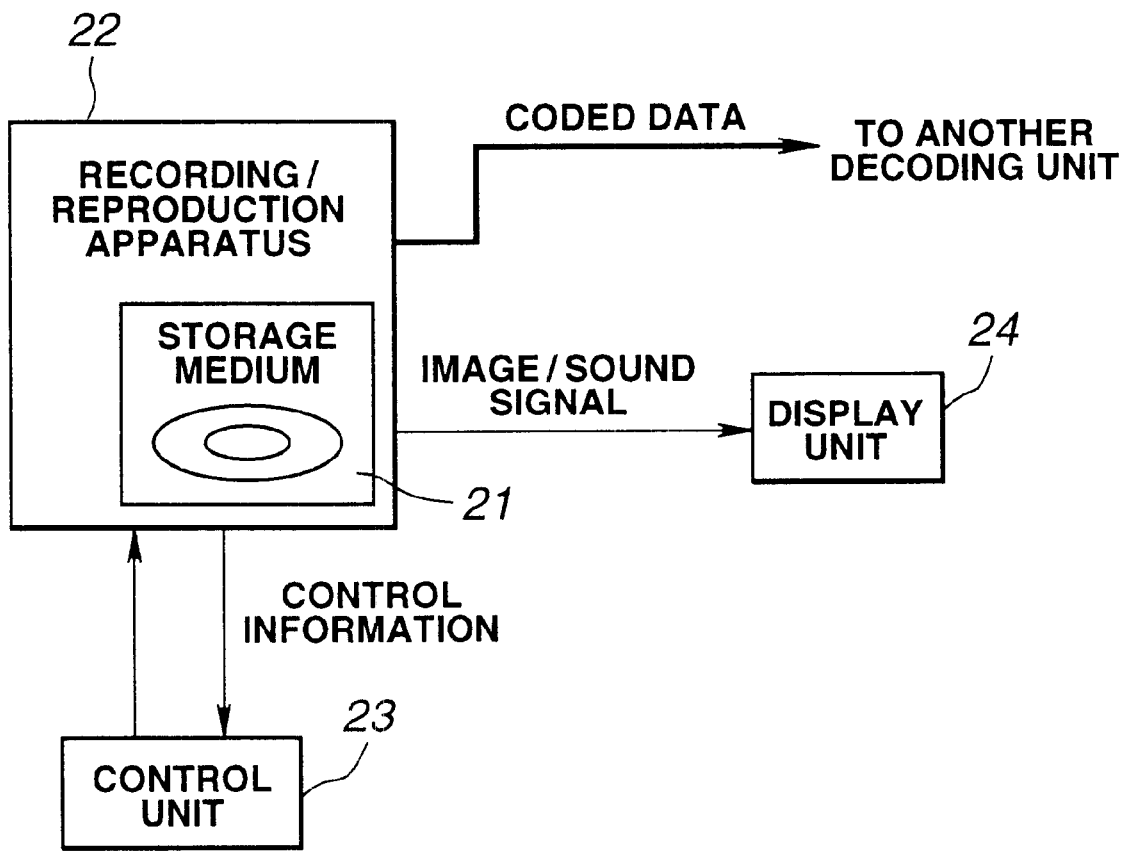
FIG. 12 is a block diagram showing a digital signal editing apparatus and method according to a third embodiment of the present invention.

As shown in FIG. 12, this digital signal editing apparatus includes a recording/reproduction apparatus 22 for recording/reproducing a coded data onto/from a storage medium 21 allowing random access; a control unit 23; and a display unit 24.

The recording/reproduction apparatus 22 can connect arbitrary points on a coded data recording in the built-in storage medium 21 so as to temporally-continuously reproduce the connected data. The control unit 23 inputs and outputs of a control signal from/to the recording/ reproduction apparatus 22.

The control signal can specify reproduction for deciding an editing point (making the recording/reproduction apparatus 22 decode a coded data and the display unit 24 display the data) and includes information on an editing point and time information of a reproduction interval.

The recording/reproduction apparatus 22 edits a TOC information according to the time information of the reproduction interval determined by the control unit 23. Because between the recording/reproduction apparatus 22 and the control unit 23, there is only input and output of control information, this third embodiment does not require any storage unit of large capacity or transfer time which have been required in a conventional system.

As has thus far been described, in the digital signal editing apparatus according to the aforementioned embodiments, TOC information is edited instead of editing a coded data. Consequently, there is no need of re-recording a coded data after edition as in an ordinary editing apparatus.

Moreover, this leads to that there is no need of a coding apparatus for recording a coded data after edition (when a data is coded by the MPEG and recorded, the MPEG encoding unit is included), or a storage medium. The time which has been required for write back is not required, either.

Moreover, by defining a plurality of TOC information, various reproduction orders can be readily selected for the same image signal. By using a decoding unit capable of temporally-continuously reproducing coded data which are discontinuously arranged, it is possible to use the TOC information so as to reproduce an image signal without causing temporal discontinuity.

Furthermore, cancel and re-edition can easily be carried out only by re-editing the information on the reproduction start point.

Moreover, in the editing apparatus having the aforementioned configuration of the second embodiment, a data which has been read out according to the TOC information can be re-coded so as to be written back to the storage medium, thus enabling to effectively use the storage medium as well as to output a coded data from the editing apparatus.

Moreover, the nonlinear edition of the aforementioned third embodiment makes unnecessary a storage unit of a large capacity or a time for transferring a coded data (or original signal) which have been required conventionally.

In the digital signal editing apparatus according to the present invention, the control means controls read-out by the read-out means according to the reproduction information on the reproduction interval of a coded data, this read-out coded data is decoded by the decoding means and is outputted after edition as a decoded data string. Consequently, it makes unnecessary to re-record the edited data, which realizes a small size of the system as well as reduces the time required for edition.

Moreover, according to the digital signal editing method according to the present invention, a plurality of coded data are read out from a storage medium allowing random access, according to the reproduction information on a reproduction interval of the aforementioned coded data. The coded data which have been read out are decoded so as to be temporally continuous and made into a decoded data string which has been edited. Consequently, it makes unnecessary to re-record the edited data, enabling to realize a small size of the system as well as to reduce the time required for edition.

What is claimed is:

1. A digital signal editing apparatus comprising:
   read-out means for reading out coded data from a storage medium allowing random access;
   storage means for storing reproduction information indicative of a reproduction segment of said coded data, wherein the reproduction segment is specified by a first editing point and a second editing point;
   control means for controlling said read-out means according to said reproduction information in order to present the first editing point and the second editing point continuously; and
   decoding means having a storage device for decoding said coded data read out by said read-out means;
   wherein the coded data represents a plurality of I, P, and B pictures, and
   wherein, when the second editing point corresponds to a B picture, said control means controls said read-out means to read out the coded data including all the data required for decoding an image to be presented at the second editing point such that the coded data of only (i) the respective I picture immediately preceding the second editing point and (ii) all P pictures between the respective I picture and the second editing point representing a reference image or images for decoding the image at the second editing point are read out from the storage medium and utilized in the decoding of the image at the second editing point even if the reference image or images are not presented without decoding and/or re-encoding any B picture between the respective I picture and the second editing point and such that the coded data of the first editing point and only the coded data of the respective I picture and all P pictures between the respective I picture and the second editing point are stored in the storage device of the decoding means so as to all be contained therein at a respective time.

2. A digital signal editing apparatus as claimed in claim 1, wherein in a case when a first coded data string preceding a data connection point for edition is to be connected to a discontinuous second coded data string, all the coded data required for decoding a first coded data of said second coded data string are decoded prior to completing decoding of said first coded data string.

3. A digital signal editing apparatus as claimed in claim 2, wherein said decoding means assumes a coded data string consisting of said first coded data string connected to said discontinuous second coded data string as a new first coded data string and connects said new first coded data string to another discontinuous second coded data.

4. A digital signal editing apparatus as claimed in claim 1, wherein said coded data is a coded-video data, coded audio data, or a data including these data multiplexed.

5. A digital signal editing apparatus as claimed in claim 1, wherein said storage medium stores said reproduction information.

6. A digital signal editing apparatus as claimed in claim 1, wherein a plurality of said reproduction information are prepared for said coded data.

7. A digital signal editing apparatus as claimed in claim 1, wherein the edited decoded data string which has been decoded and outputted by said decoding means is again coded and written into said storage medium.

8. A digital signal editing apparatus as claimed in claim 1, wherein said coded data are coded data which have been coded by the predictive coding method.

9. A digital signal editing apparatus as claimed in claim 1, wherein said coded data are I pictures, P pictures, and B pictures of the MPEG method.

10. A digital signal editing method comprising the steps of:
reading out coded data from a storage medium allowing random access according to reproduction information indicative of a reproduction segment of said coded data in order to skip from a first editing point to a second editing point continuously, and decoding the coded data so as to form an edited decoded data string;
wherein the coded data represents a plurality of I, P, and B pictures, and wherein, when the second editing point corresponds to a B picture, said read-out step includes a step for reading out coded data including all the data required for decoding an image to be presented at the second editing point such that the coded data of only (i) the respective I picture immediately preceding the second editing point and (ii) all P pictures between the respective I picture and the second editing point representing a reference image or images for decoding the image at the second editing point are read out from the storage medium and utilized in the decoding of the image at the second editing point even if the reference image or images are not presented without decoding and/or re-encoding any of the P pictures and/or B pictures between the respective I picture and the second editing point and such that the coded data of the first editing point and only the coded data of the respective I picture and all P pictures between the respective I picture and the second editing point are stored simultaneously in a storage means so as to all be contained therein at a respective time.

11. A digital signal editing method as claimed in claim 10, wherein said edited decoded data string is obtained, when a first coded data string preceding a data connection point for edition is to be connected to a discontinuous second coded data string, by decoding all the coded data required for decoding a first coded data of said second coded data string prior to completing decoding of said first coded data string.

12. A digital signal editing method as claimed in claim 11, wherein a coded data string consisting of said first coded data string connected to said discontinuous second coded data string is assumed to be as a new first coded data string, which is connected to another discontinuous second coded data, so as to obtain said edited decoded data string.

13. A digital signal editing method as claimed in claim 10, wherein said coded data is a coded video data, coded audio data, or a data including these data multiplexed.

14. A digital signal editing method as claimed in claim 10, wherein said storage medium stores said reproduction information.

15. A digital signal editing method as claimed in claim 10, wherein a plurality of said reproduction information are prepared for said coded data.

16. A digital signal editing method as claimed in claim 10, wherein the edited decoded data is again coded and written into said storage medium.

17. A digital signal editing method as claimed in claim 10, wherein said coded data are coded data which have been coded by the predictive coding method.

18. A digital signal editing method as claimed in claim 10, wherein said coded data are I pictures, P pictures, and B pictures of the MPEG method.

* * * * *